United States Patent [19]

Moribayashi et al.

[11] Patent Number: 5,481,148
[45] Date of Patent: Jan. 2, 1996

[54] PERMANENT MAGNET TYPE ROTATING MACHINE

[75] Inventors: Satoshi Moribayashi; Shuzou Isozumi; Takeo Gotou, all of Himeji, Japan

[73] Assignee: Mitsubishi Denki Kabushiki Kaisha, Tokyo, Japan

[21] Appl. No.: 207,199

[22] Filed: Mar. 8, 1994

[30] Foreign Application Priority Data

Mar. 26, 1993 [JP] Japan ................................. 5-068215

[51] Int. Cl.⁶ ........................................................ H02K 1/18
[52] U.S. Cl. .................................. 310/154; 310/89; 310/91
[58] Field of Search ............................ 310/154, 89, 91, 310/218, 88, 261

[56] References Cited

U.S. PATENT DOCUMENTS

| | | | |
|---|---|---|---|
| 4,414,481 | 11/1983 | de Jong | 310/89 |
| 4,538,085 | 8/1985 | Tanaka . | |
| 4,580,072 | 4/1986 | Morishita . | |
| 4,748,358 | 5/1988 | Ruhle et al. | 310/154 |
| 4,827,173 | 5/1989 | Corbach et al. | 310/91 |
| 4,873,461 | 10/1989 | Brennan et al. | 310/154 |
| 4,933,583 | 6/1990 | Hata et al. | 310/154 |
| 5,135,200 | 5/1994 | Lemieux et al. | 310/91 |

FOREIGN PATENT DOCUMENTS

| | | | |
|---|---|---|---|
| 1048334 | 1/1959 | Germany | 310/154 |
| 38733 | 11/1973 | Japan . | |
| 501989 | 11/1982 | Japan . | |
| 1404812 | 9/1975 | United Kingdom | 310/154 |

*Primary Examiner*—R. Skudy
*Attorney, Agent, or Firm*—Sughrue, Mion, Zinn, Macpeak & Seas

[57] ABSTRACT

A permanent magnet type rotating machine comprises a cylindrical yoke; a plurality of permanent magnets installed on an inner periphery of the cylindrical yoke; a rotor rotatably installed at an inner peripheral portion of the plurality of permanent magnets; and a retaining portion provided at a conventional constituent member of the permanent magnet type rotating machine to elastically retain the plurality of permanent magnets in an axial direction.

2 Claims, 14 Drawing Sheets

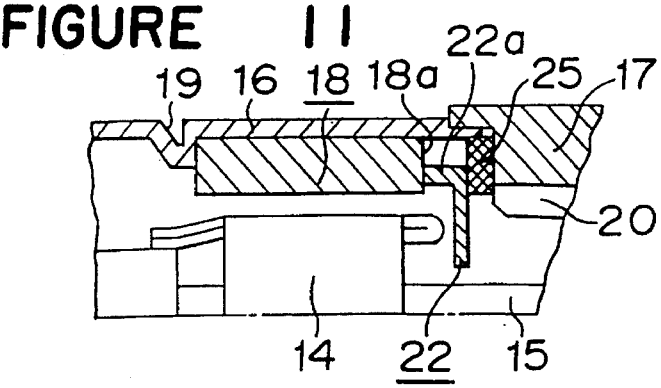
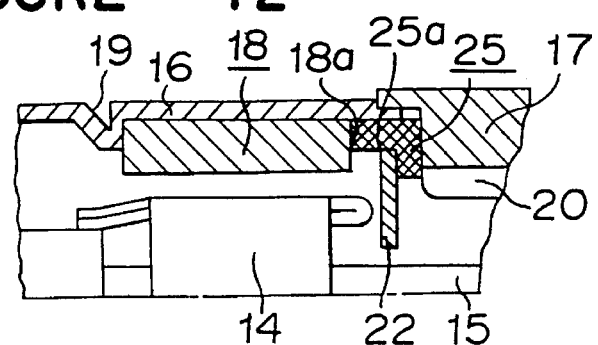
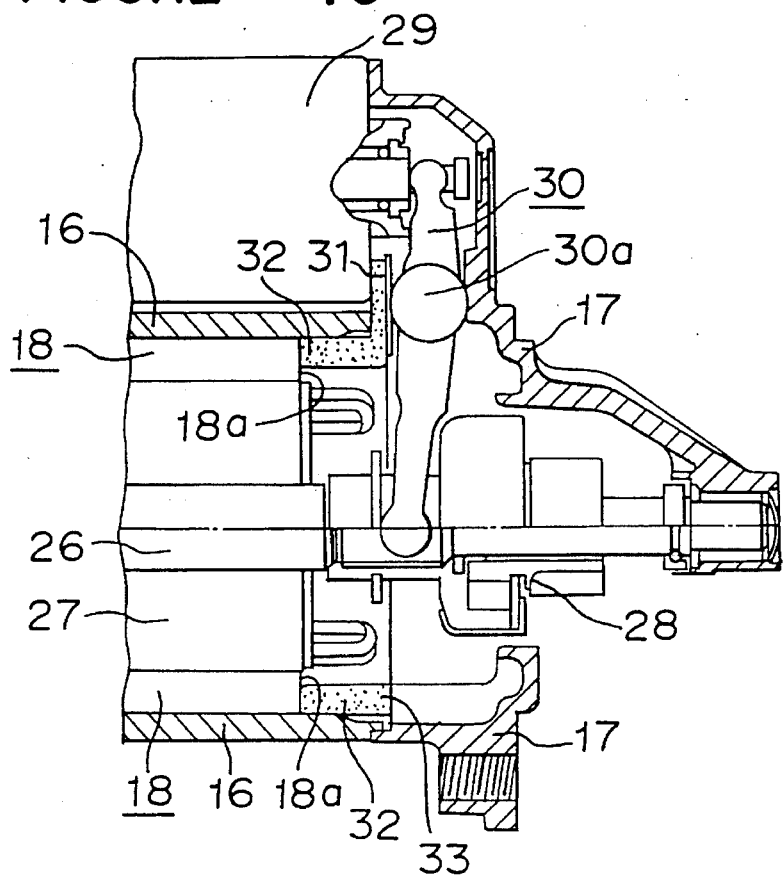

5,481,148

PERMANENT MAGNET TYPE ROTATING MACHINE

BACKGROUND OF THE INVENTION

1. Field of the Invention

The present invention relates to a permanent magnet type rotating machine employing permanent magnets as field magnetic poles.

2. Discussion of Background

FIGS. 34 through 36 are diagrams showing a magnet fixing device of a conventional small-sized motor disclosed, for instance, in Japanese Examined Utility Model Publication No. 38733/1973, wherein FIG. 34 is a partially broken front diagram, FIG. 35 is a partially broken side diagram of FIG. 34, and FIG. 36 is a diagram showing an elastic fixing plate 10 in FIG. 35.

In FIGS. 34 through 36, reference numeral 1 designates a motor housing (yoke), to an end portion of which a bearing metal 2 is press-fixed by a press-fixing plate 3. Numeral 4 designates a plurality of fixing pieces which are cut out to the inner side of the motor housing 1, each of which is provided with an angle α to retain ones of tapered portions 7 and 8 which are formed at both ends of arcuate magnets 5 and 6. The inner diameter B of the fixing piece 4 is formed larger than an inner diameter C which is formed by the arcuate magnets 5 and 6. Numeral 9 designates protrusions which are protruded to the inner side of the motor housing 1, for positioning the arcuate magnets 5 and 6 in the circumferential direction. Numeral 10 designates a ring-like elastic fixing plate, which is formed by an elastic material such as steel plate for spring and phosphor bronze plate for spring, at the inner side of which a plurality of press-fixing claws 11 are provided for retaining the other tapered portions 8 of the arcuate magnets 5 and 6, and at the outer diameter portion of which a plurality of fixing claws 12 are provided for fixing the elastic fixing plate 10 to the housing 1 in press-fitting the elastic fixing plate 10 to the motor housing 1 in a press-fitting operation. Further, the fixing claw 12 is inclined toward the outside of the magnet by an angle of θ with respect to a plane 13 of the elastic fixing plate 10. The outermost diameter D of the fixing claw 12 is formed slightly larger than the inner diameter A of the motor housing, and the inner diameter E thereof that is the same with the inner diameter of the press-fixing claw 11, is formed larger than the inner diameter C of the magnets 5 and 6.

An explanation will be given of the integrating operation of the magnet fixing device in the above construction. First, the bearing metal 2 is press-fixed to one end portion of the motor housing 1 by the press-fixing plate 3. Next, the arcuate magnets 5 and 6 are inserted to the inner diameter portion of the motor housing 1 along the positioning protrusions 9. Then, the tapered portions 7 are retained by the fixing pieces 4. Further, the elastic fixing plate 10 is finally press-fitted to the inner diameter portion of the motor housing by a pertinent pressure, and the press-fitting is stopped when the press-fixing claws 11 apply a pertinent pressure on the tapered portions 8 of the magnets 5 and 6.

As stated above, in the conventional permanent magnet type rotating machine, the permanent magnets 5 and 6 are fixed in the axial direction by the elastic fixing plate 10 which has been press-fitted and fixed in the yoke 1. Accordingly, the elastic fixing plate 10 for fixing the permanent magnets 5 and 6 in the axial direction is necessary as an additional member, which increases the number of parts and increases the production cost.

SUMMARY OF THE INVENTION

It is an object of the present invention to solve the above problems and to provide a permanent magnet type rotating machine which positions and fixes the permanent magnets in the axial direction without increasing the number of parts thereby achieving the cost reduction.

According to an aspect of the present invention, there is provided a permanent magnet type rotating machine comprising:

a cylindrical yoke;

a plurality of permanent magnets installed on an inner periphery of the cylindrical yoke;

a rotor rotatably installed at an inner peripheral portion of the plurality of permanent magnets; and a retaining portion provided at a conventional constituent member of the permanent magnet type rotating machine to elastically retain the plurality of permanent magnets in an axial direction.

According to the aspect of the present invention, an additional member is not necessary for fixing the permanent magnets in the axial direction, since the retaining portion is provided at a conventional constituent part.

BRIEF DESCRIPTION OF THE DRAWINGS

FIG. 11 is an axially divided sectional diagram of important parts showing Example 6 of this invention;

FIG. 12 is an axially divided sectional diagram of important parts showing Example 7 of this invention;

FIG. 13 is a sectional diagram of the front side of a starter showing Example 8 of this invention;

DETAILED DESCRIPTION OF THE PREFERRED EMBODIMENTS

EXAMPLE 1

Figure 1:
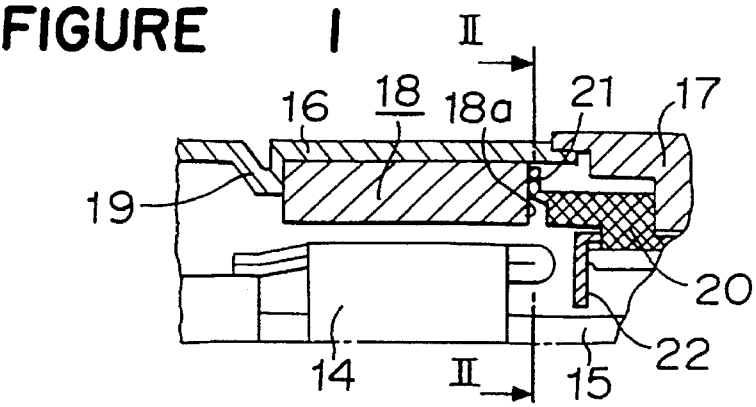
FIG. 1 is an axially divided sectional diagram of important parts showing Example 1 of the invention.

An explanation will be given of an embodiment of this invention in reference to FIGS. 1 through 3. FIG. 1 is an axially divided sectional diagram of important parts, FIG. 2 is a sectional diagram (excluding a plate) viewed from the line II—II of FIG. 1, and FIG. 3 is a diagram viewing FIG. 2 from the rear side (front side of motor).

Figure 2:
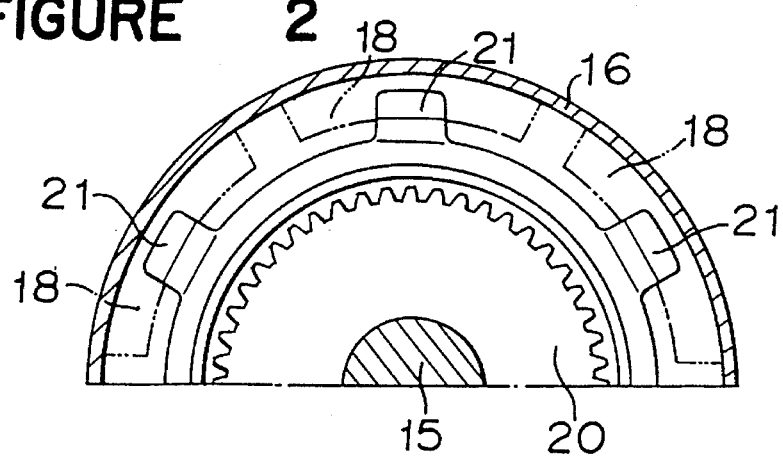
FIG. 2 is a sectional diagram (excluding a plate) viewed from the line II—II of FIG. 1.
Figure 3:
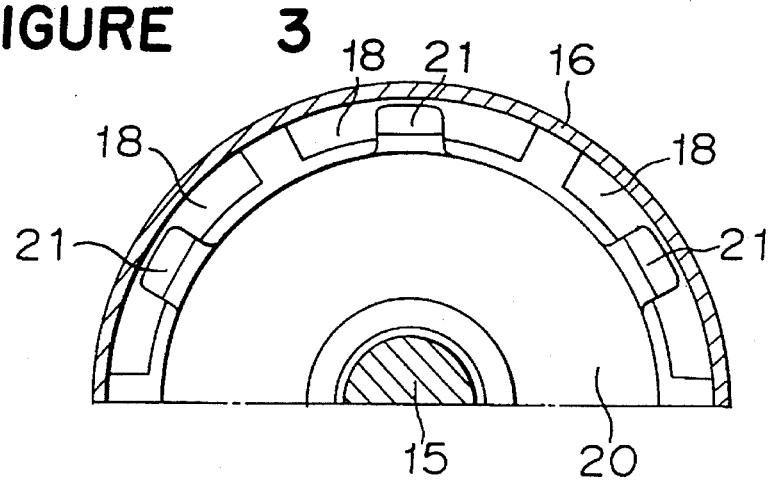
FIG. 3 is a diagram viewing FIG. 2 from the rear side.

In FIGS. 1 through 3, reference numeral 14 designates an armature, 16, a cylindrical yoke made from a steel plate, 17, a bracket fitted to an opening portion of the yoke 16, 18, permanent magnets composing field magnetic poles, 19, a punched-out portion formed in the yoke 16, and 20, an internal gear of a planetary gear speed reducing mechanism, which is fixed to the bracket 17. Numeral 21 designates a retaining portion which is integrated to the internal gear 20 in use of an elastic material, and which is protruded so as to press an end face 18a of the permanent magnet 18. Numeral 22 designates a plate fixed to the internal gear 20, which is provided for dust proof and oil proof against dust or oil from the contiguous planetary gear device and the like. As shown in these diagrams, in a state wherein the permanent magnets 18 are installed, the permanent magnets 18 are pressed by the elastically deformed retaining portions 21 in the axial direction and are positioned and fixed between the punched-out portion 19 and the retaining portions 21. Therefore, the permanent magnets 18 are fixed in the axial direction by a conventional constituent member of the internal gear 20.

EXAMPLE 2

Figure 4:
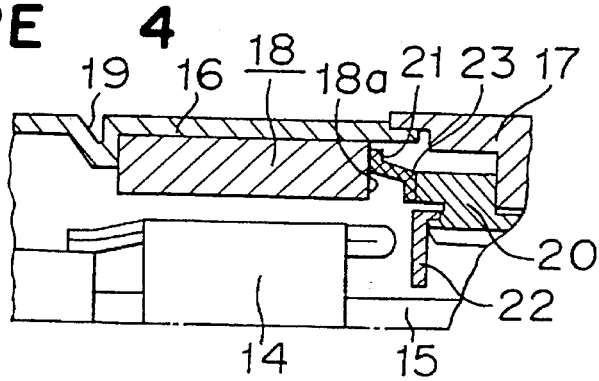
FIG. 4 is an axially divided sectional diagram of important parts showing Example 2 of this invention.
Figure 5:
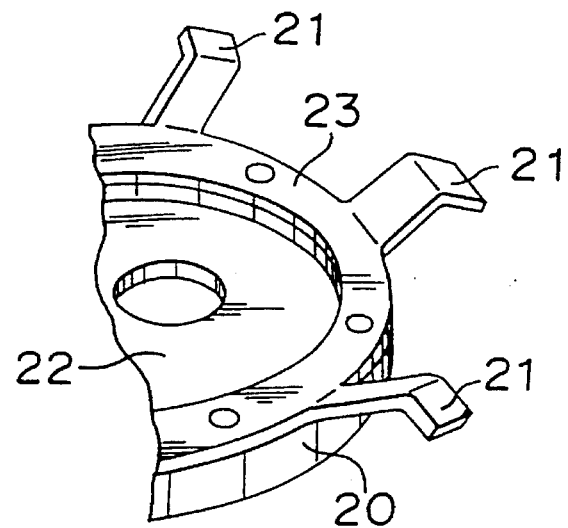
FIG. 5 is a partial perspective view showing a ring-like elastic member of FIG. 4.

In the above Example 1, the retaining portion 21 is integrated to the internal gear 20. However, as shown in FIGS. 4 and 5, the retaining portions 21 may be provided at a separate ring-like elastic member 23, which is fixed to the internal gear 20. In this case, the internal gear 20 can be formed by a metal or a synthetic resin (for instance, plastics).

EXAMPLE 3

Figure 6:
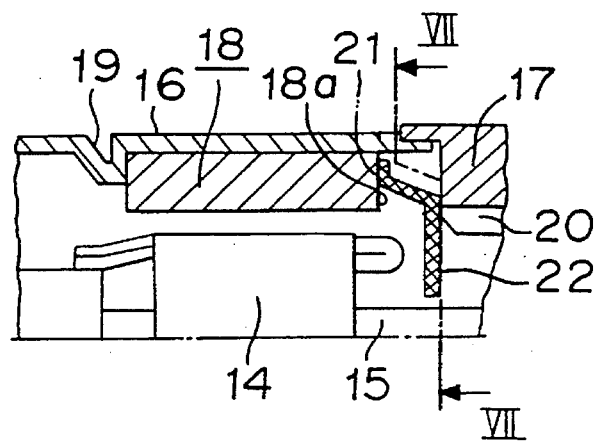
FIG. 6 is an axially divided sectional diagram of important parts showing Example 3 of this invention.
Figure 7:
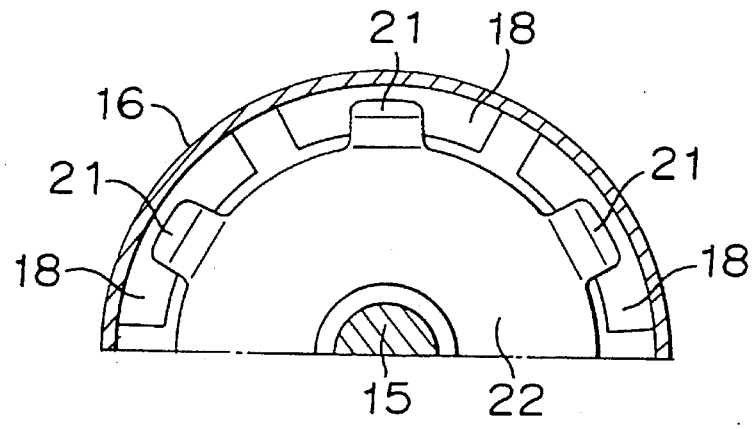
FIG. 7 is a sectional diagram viewed from the line VII—VII of FIG. 6.

In the above Examples 1 and 2, the retaining portions 21 are provided on the side of the internal gear 20. However, as shown in FIGS. 6 and 7, the retaining portions 21 are integral with the dust proof and oil proof plate 22 in use of an elastic material. The plate 22 which is a conventional constituent member, is, for instance, a pressed product of steel plate that causes an elastic force by the steel plate on the retaining portions 21.

EXAMPLE 4

Figure 8:
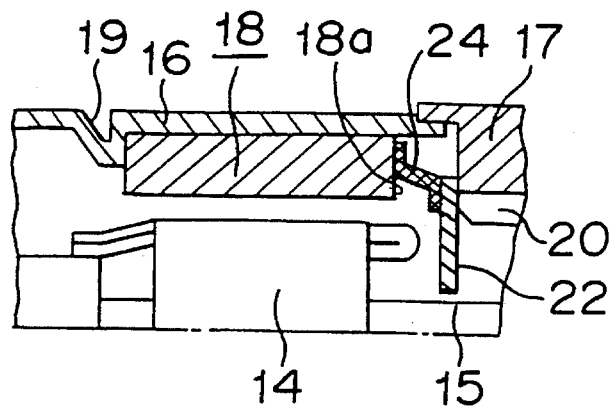
FIG. 8 is an axially divided sectional diagram of important parts showing Example 4 of this invention.
Figure 9:
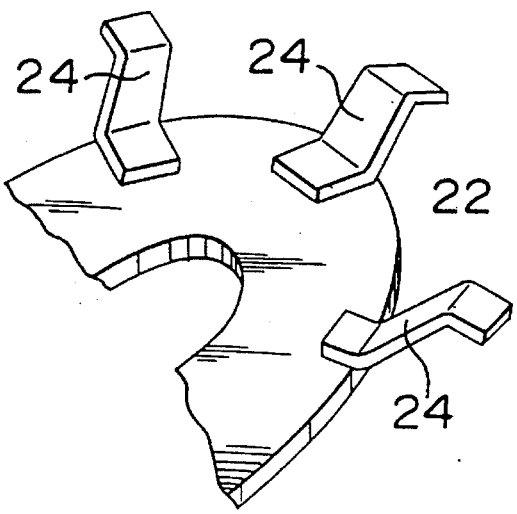
FIG. 9 is a partial perspective view showing a plate in FIG. 8.

In the above Example 3, the retaining portions 21 are integrated to the plate 22. However, as shown in FIGS. 8 and 9, the retaining portion may be composed of a plurality of elastic members 24 which are fixed to the plate 22 by connecting means such as welding, eyeleting and riveting.

EXAMPLE 5

Figure 10:
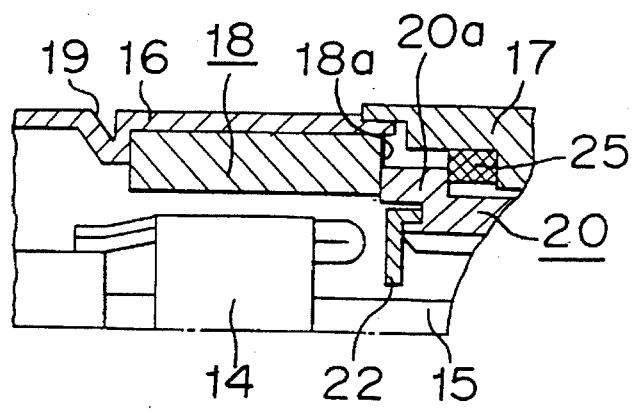
FIG. 10 is an axially divided sectional diagram of important parts showing Example 5 of this invention.

In the above Examples 1 and 2, the retaining portion 21 is provided on the side of the internal gear 20 and the internal gear 20 directly may contact the bracket 17 in the axial direction. However, as shown in FIG. 10, a portion 20a of the internal gear 20 may contact the end face 18a of the permanent magnet 18, and an elastic body (gummy packing, spring, beleville spring, etc.) 25 may be inserted between the internal gear 20 and the bracket 17 thereby pressing the permanent magnets 18 by the portion 20a of the internal gear 20. Also in this case, the internal gear 20 may be formed by a metal or a plastics as in the conventional case.

EXAMPLE 6

In the above Examples 3 and 4, the retaining portions 21 are provided on the side of the plate 22 and the plate 22 directly contacts the internal gear 20. However, as shown in FIG. 11, a portion 22a of the plate 22 may contact the end face 18a of the permanent magnets 18, and the elastic body 25 may be inserted between the plate 22 and the internal gear 20 thereby pressing the permanent magnets 18.

EXAMPLE 7

In the above Example 6, the portion 22a of the plate 22 directly contacts the permanent magnet 18. However, as shown in FIG. 12, a portion 25a of the elastic body 25 may contact the end faces 18a of the permanent magnets 18 thereby pressing the permanent magnets 18.

EXAMPLE 8

Figure 14:
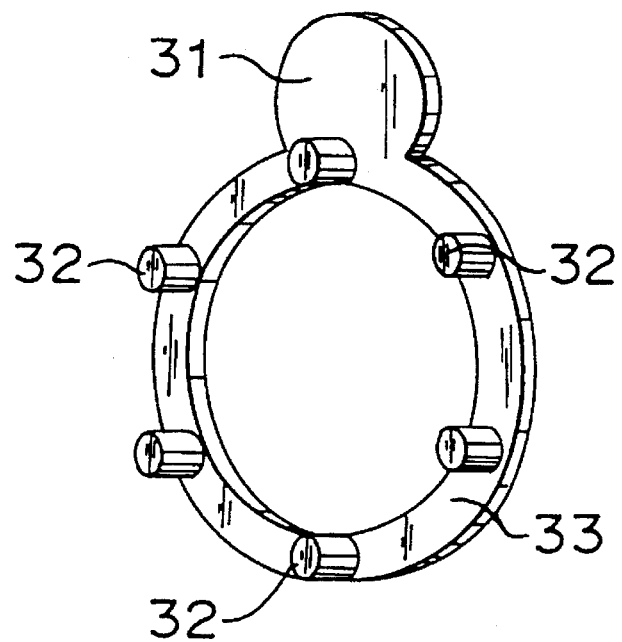
FIG. 14 is a perspective view showing a lever packing in FIG. 13.

Next, an explanation will be given of a case wherein a lever packing is employed as a conventional constituent member in reference to FIGS. 13 and 14. In FIGS. 13 and 14, reference numeral 26 designates an armature shaft of a direct current motor, 27, an iron core of an armature, and 28, an overrunning clutch, which is provided with a pinion in mesh with a ring gear of an engine, not shown. Numeral 29 designates an electromagnetic switch, and 30, a shift lever which is operated by the electromagnetic switch 29, and which moves the overrunning clutch 28 and the pinion in the axial direction in starting the engine. Numeral 31 designates a resilient lever packing which is provided between a fulcrum 30a of the shift lever 30 and the yoke 16, and 32, protrusions which are the retaining portion, and which are integrated with the lever packing 31 through a ring-like member 33.

In a state wherein the lever packing 31 is installed by the bracket 17, as shown in FIG. 13, the protrusions 32 press the end faces 18a of the permanent magnets 18. Therefore, the permanent magnets 18 can be fixed in the axial direction.

EXAMPLE 9

Figure 15:
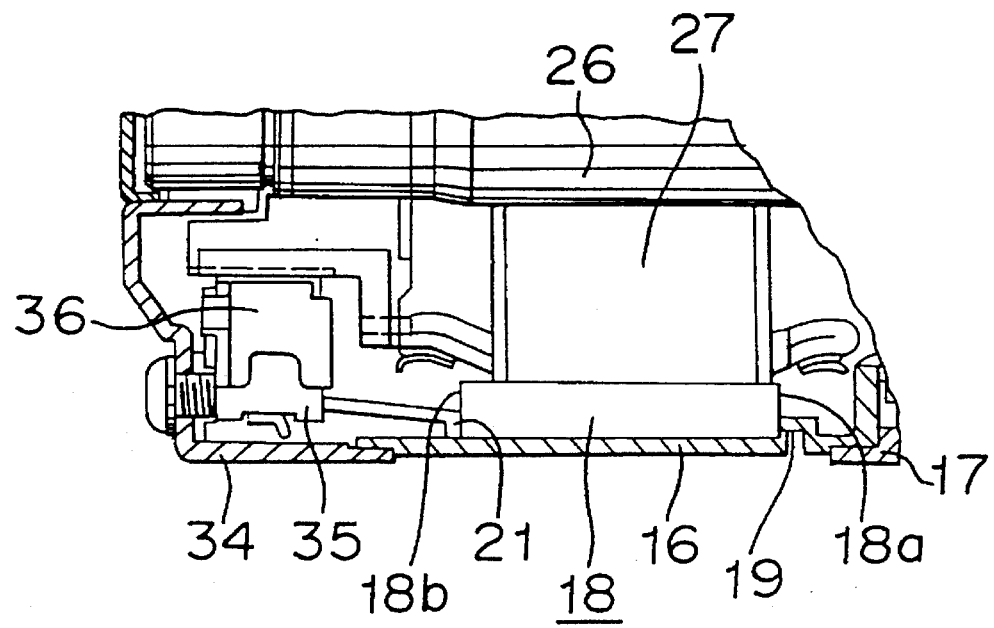
FIG. 15 is a sectional diagram of the rear side of a starter showing Example 9 of this invention.
Figure 16:
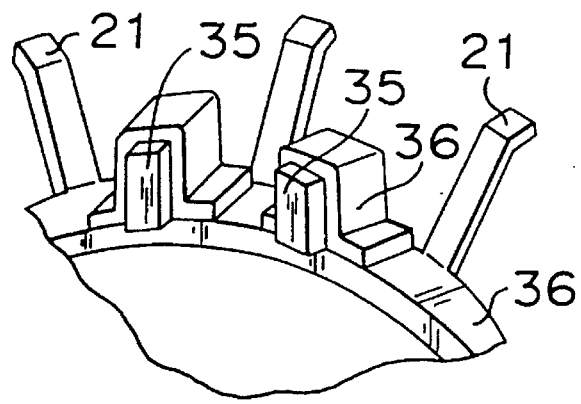
FIG. 16 is a partial perspective view showing a brush holder in FIG. 15.

An explanation will be given of a case wherein a brush holder is employed as a conventional constituent member in reference to FIGS. 15 and 16. In FIGS. 15 and 16, numeral 34 designates a rear bracket, 35, commutator brushes, and 36, a brush holder which is integrated with the retaining portions 21.

In a state wherein the brush holder 36 is installed, the retaining portions 21 contact end faces 18b of the permanent magnets 18 and press the permanent magnets 18 by their elastic forces. Therefore, the permanent magnets 18 can be fixed in the axial direction.

EXAMPLE 10

Figure 17:
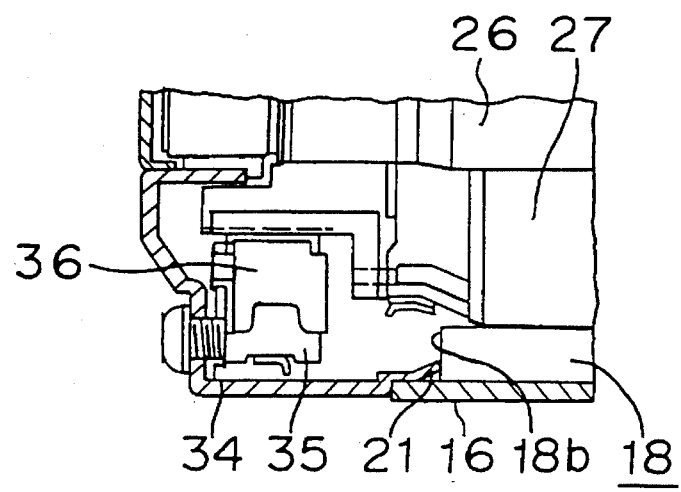
FIG. 17 is a sectional diagram of the rear side of a starter showing Example 10 of this invention.
Figure 18:
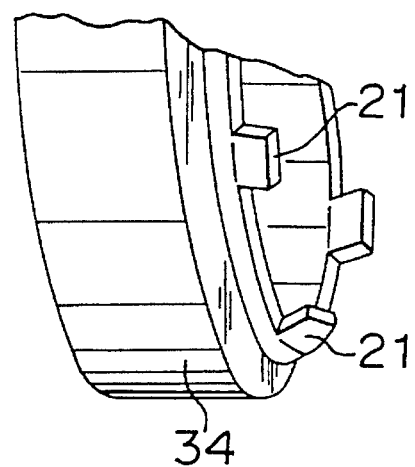
FIG. 18 is a partial perspective showing a rear bracket in FIG. 17.

In the above Example 8, the retaining portions 21 are integrated to the brush holder 36. However, as shown in FIGS. 17 and 18, the retaining portions 21 may be integrated to the rear bracket 34.

EXAMPLE 11

Figure 19:
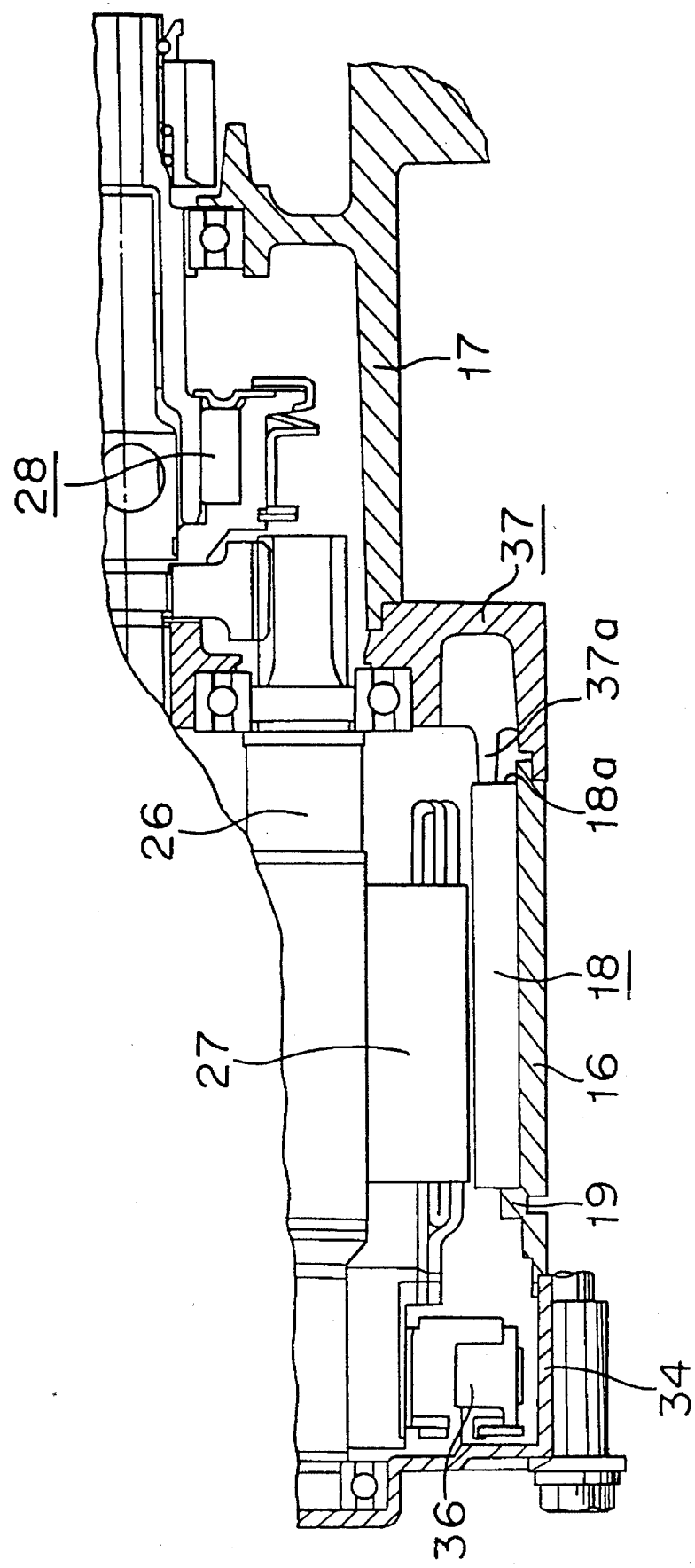
FIG. 19 is a sectional diagram of important parts of a starter showing Example 11 of this invention.
Figure 20:
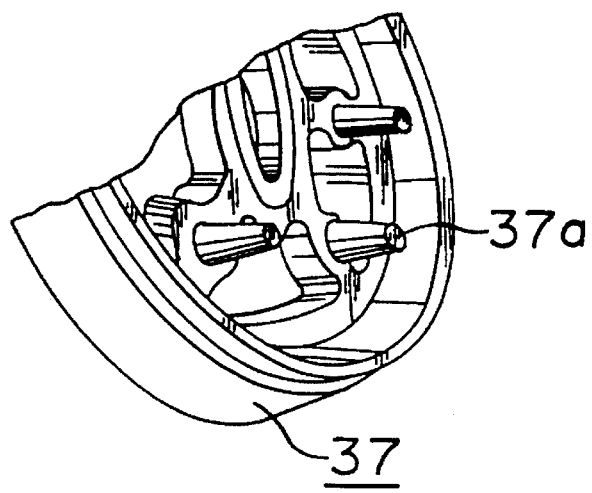
FIG. 20 is a partial perspective view showing a center bracket in FIG. 19.

Next, an explanation will be given of a case wherein a center bracket is employed as a conventional constituent member in reference to FIGS. 19 and 20. In FIGS. 19 and 20, reference numeral 37 designates a center bracket interposed between the yoke 16 and the front bracket 17, which is resilient and which is integrated with protrusions 37a, the retaining portions, that is made of, for instance, chloroprene gum.

In a state wherein the center bracket 37 is installed, the protrusion 37a contact the end faces 18a of the permanent magnets 18 and press the permanent magnets 18 in the axial direction by their elastic forces. Accordingly, the permanent magnets 18 are fixed in the axial direction.

EXAMPLE 12

Figure 21:
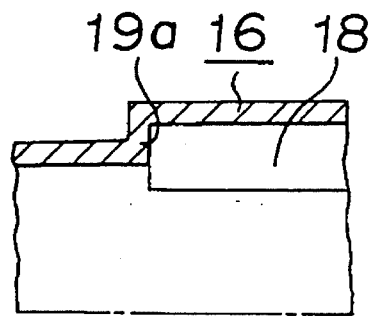
FIG. 21 is an axially divided sectional diagram of important parts showing Example 12 of this invention.
Figure 22:
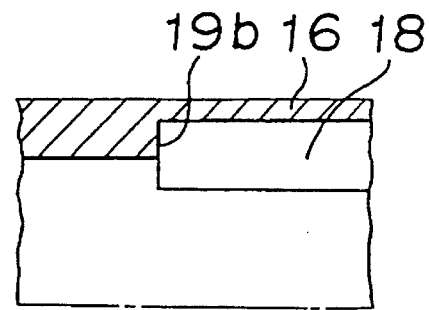
FIG. 22 is a diagram showing another Example of FIG. 21.

In the above Examples 1 through 11, the punched-out portion 19 in the yoke 16 is shown as a member for positioning the end faces 18a or 18b of the permanent magnets 18. However, as shown, for instance, in FIG. 21, the punched-out portion 19 may be substituted by a difference in level 19a, or a thickened portion 19b of the yoke 16 as shown in FIG. 22.

EXAMPLE 13

In the above Examples 1 through 12, only the fixing of the permanent magnet 18 in the axial direction is shown. By contrast, an explanation will be given of the fixing of the permanent magnet 18 in the circumferential direction in reference to FIGS. 23 and 24.

Figure 23:
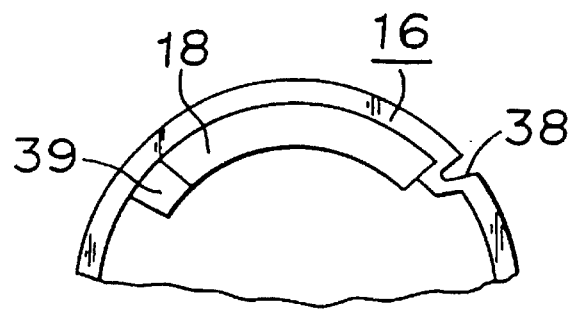
FIG. 23 is a sectional diagram of important parts showing Example 13 of this invention.
Figure 24:
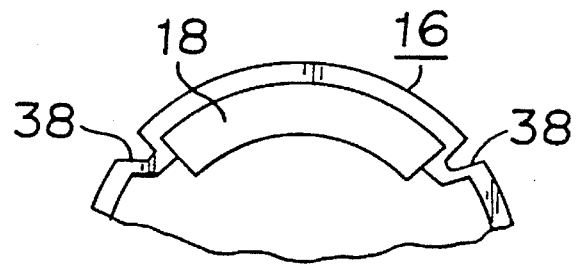
FIG. 24 is a diagram showing another Example of FIG. 23.

In FIG. 23, the permanent magnet 18 is positioned and fixed between a punched-out portion 38 of the yoke 16 and a commutating pole which is fixed to the yoke 16 by welding. In FIG. 24, the permanent magnet 18 is positioned and fixed between two of the punched-out portions 38.

EXAMPLE 14

Figure 25:
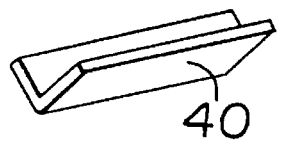
FIG. 25 is a perspective view of a holder showing Example 14 of this invention.
Figure 26:
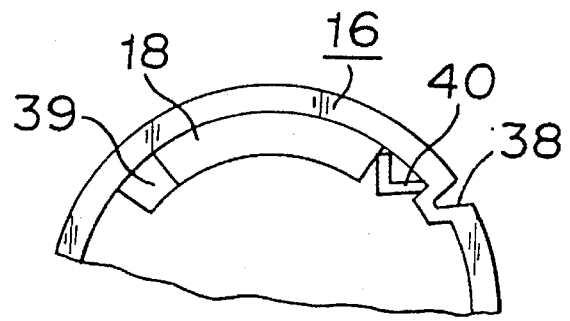
FIG. 26 is a sectional diagram showing an Example in use of the holder in FIG. 25.
Figure 27:
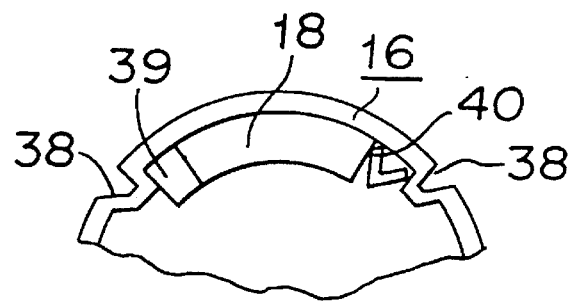
FIG. 27 is a diagram showing another Example of FIG. 26.

When a holder 40 which is provided with an elasticity by bending a phosphorus bronze plate as shown in FIG. 25, is used in the above Example 13, the punched-out portion 38 and the commutating pole 39 may previously be arranged as shown in FIG. 26 and afterwards, the permanent magnet 18 may be fixed by the holder 40. Further, as shown in FIG. 27, two of the punched-out portions 38 may previously be arranged and afterwards, the permanent magnet 18 and the commutating pole 39 may be fixed by the holder 40. Accordingly, the integrating operational performance can be improved.

EXAMPLE 15

Figure 31:
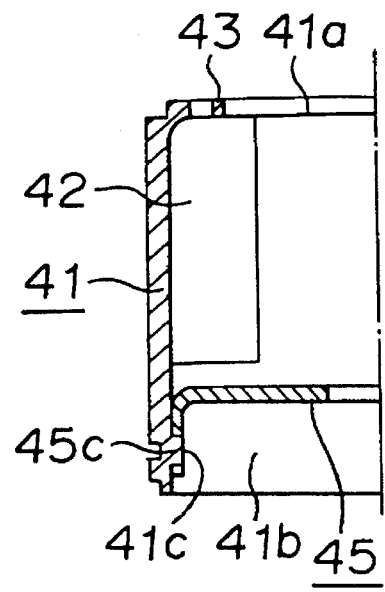
FIG. 31 is a sectional diagram viewed from the line XXXI—XXXI of FIG. 29.

Next, an explanation will be given of other Examples of this invention in reference to FIGS. 28 through 31. In FIGS. 28 through 31, reference numeral 41 designates a cylindrical yoke, 42, a plurality (six in the drawings) of permanent magnets installed on the inner peripheral face of the yoke 41 and 43, a bent portion connected to a rear side cylinder opening 41a of the yoke 41, which is provided with punched-out portions 43a at positions corresponding to the widths (each of which is a width including that of a commutating pole 44 in the drawing) of the permanent magnet 42. Reference numeral 45 designates a holder plate which is attachably and detachably fixed to a front side cylinder opening 41b of the yoke 41, and which is provided with bent spring portions 45a pressing the permanent magnets 42 in the axial direction, and spacers 45b positioning the permanent magnets 42 in the circumferential direction. As shown in FIG. 31, the holder plate 45 is fixed to the yoke 41 by press-fitting holes 45c to punched-out portions 41c of the yoke 41.

The holder plate 45 is provided for the purpose of dust proof, grease seal or the like against dust from a contiguous clutch or the like on the front side, which is one of the conventional constituent members.

Figure 28:
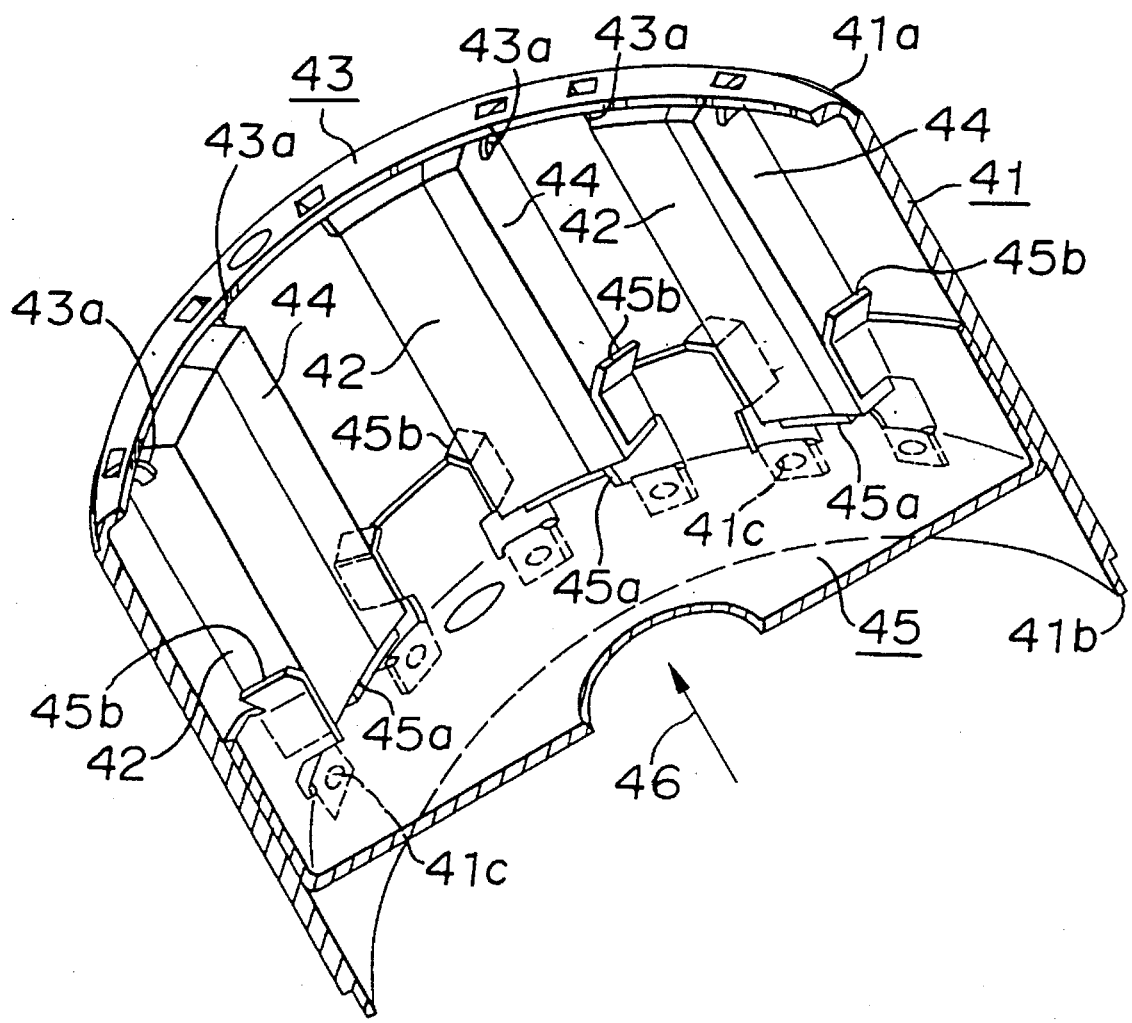
FIG. 28 is a half sectional perspective view showing Example 15 of this invention.
Figure 29:
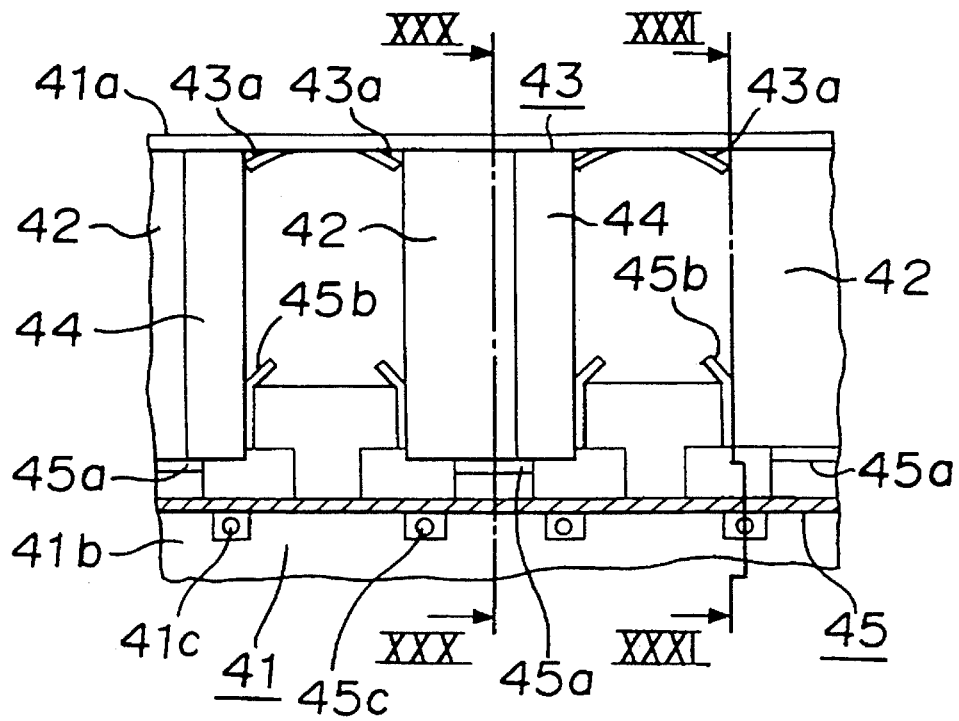
FIG. 29 is a development diagram viewing FIG. 28 from the opening side.
Figure 30:
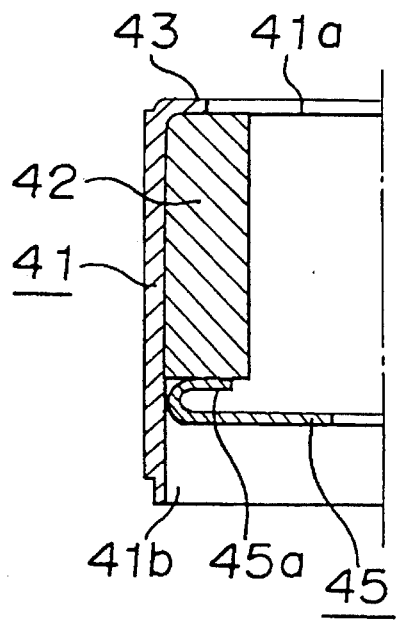
FIG. 30 is a sectional diagram viewed from the line XXX—XXX of FIG. 29.

Finally, when the holder plate 45 is fixed to the yoke 41 by inserting the holder plate 45 in the direction of an arrow mark 46 in FIG. 28, the permanent magnets 42 can be fixed between the bent portion 43 and the holder plate 45 by pressing the permanent magnets 42 in the axial direction by the bent spring portions 45a, and also the permanent magnets 42 can be positioned in the circumferential direction by the spacers 45b and the bent portions 43a.

In this way, the fixing of the permanent magnets 42 in the axial direction and in the circumferential direction can be performed in one motion by the holder plate 45 which is fitted in the yoke 40. Therefore, the total axial length does not increase more than the conventional case. Further, the integrating operation can be performed only by fitting, inserting and fixing the holder plate 45 into the yoke 41, and therefore, the operational performance is improved. Further, the commutating pole 44 does not have to be welded to the yoke 41, and the invention can handle a case wherein there is no commutating pole 44.

EXAMPLE 16

Figure 32:
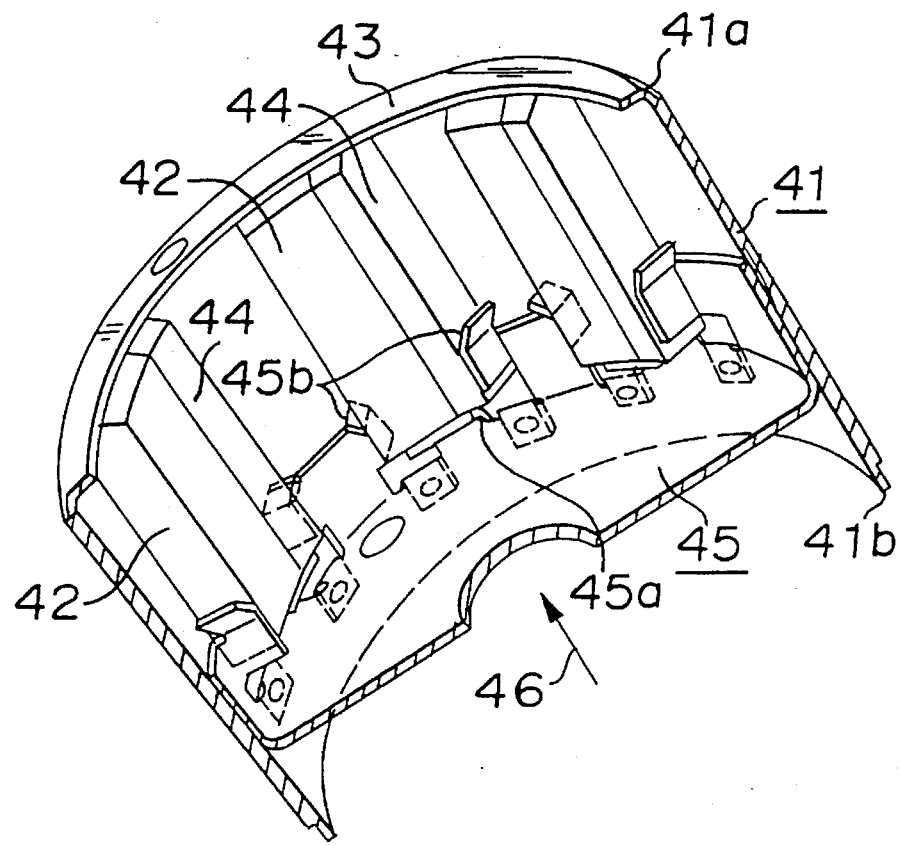
FIG. 32 is a half sectional perspective view showing Example 16 of this invention.
Figure 33:
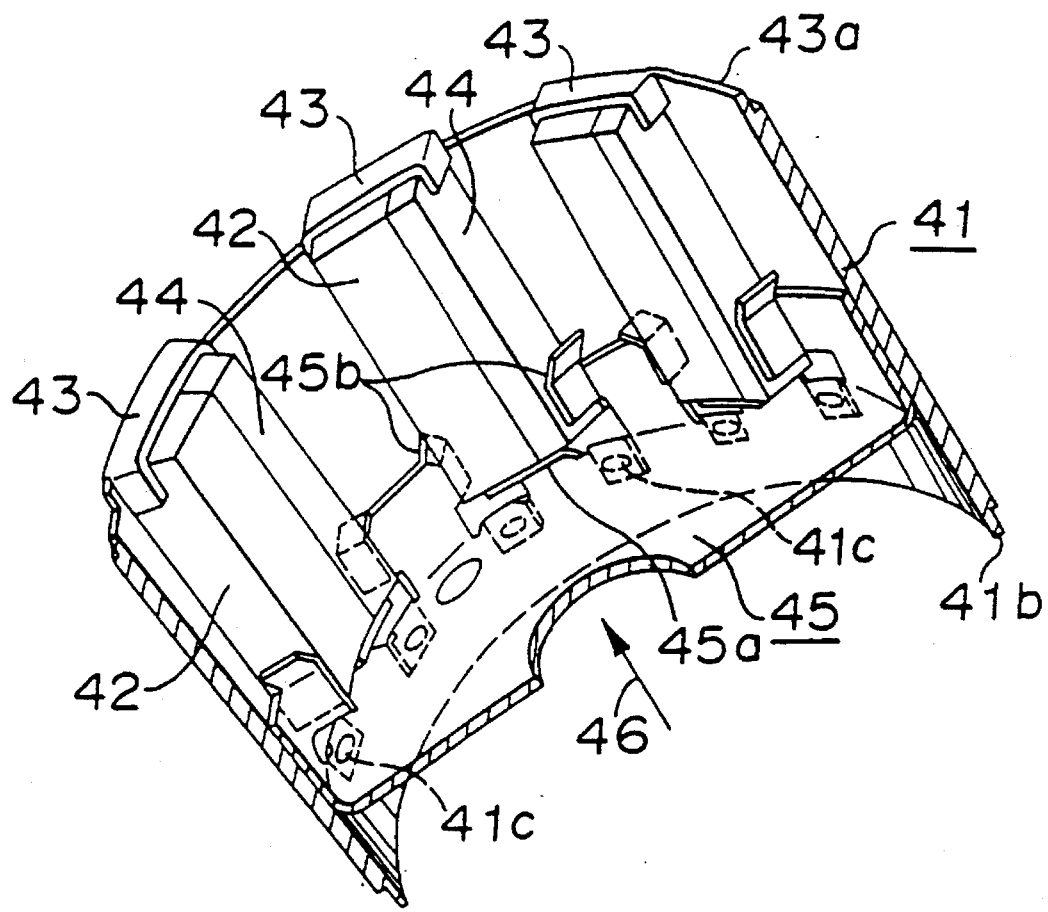
FIG. 33 is a half sectional perspective view showing Example 17 of this invention.
Figure 34:
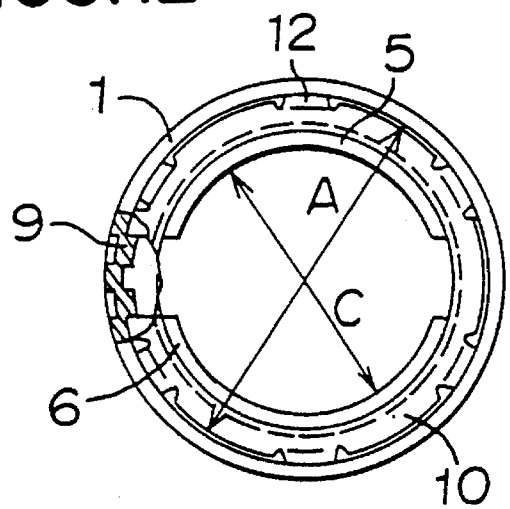
FIG. 34 is a partially broken front diagram showing a conventional device.
Figure 35:
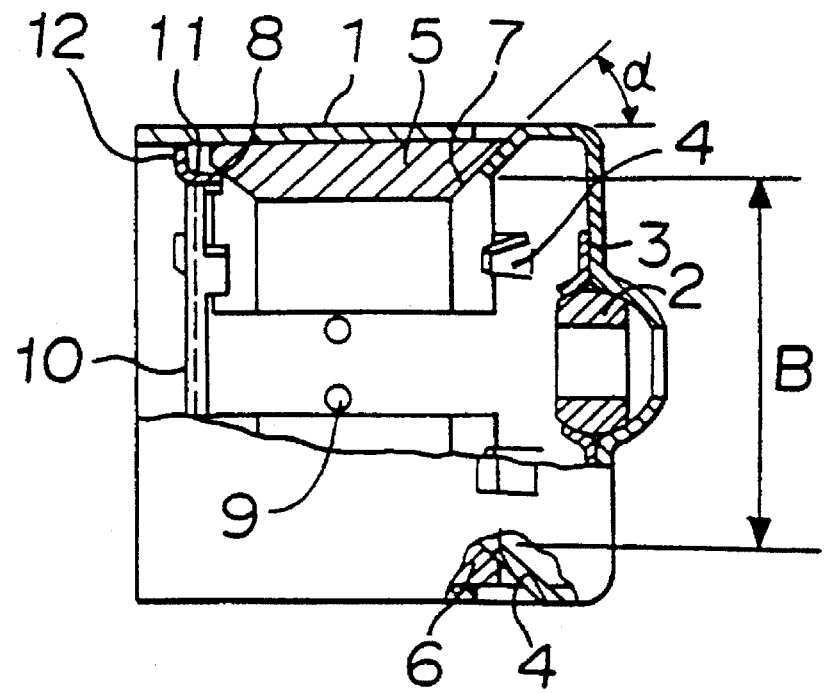
FIG. 35 is a partially broken side diagram of FIG. 34.
Figure 36:
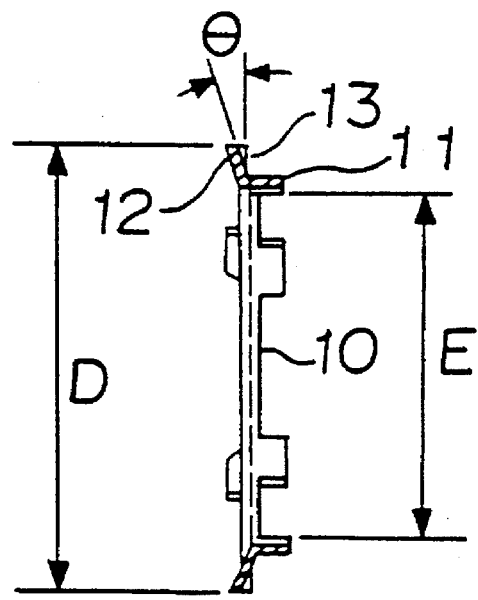
FIG. 36 is a diagram showing an elastic fixing plate in FIG. 35.

In the above Example 15, the punched-out portions 43*a* formed on the bent portion 43 of the yoke 41 may not be provided and the construction may be as shown in FIG. 32. In this case, the positioning of the permanent magnets 42 in the circumferential direction can be maintained by increasing the spring forces of the bent spring portions 45*a* of the holder plate 45, which facilitates the working operation by dispensing with the punched-out portions 43*a*.

EXAMPLE 17

In the above Example 15, the bent portion 43 of the yoke 41 is formed at all the circumferential portion of the yoke 41. However, the bent portion 43 may be formed in a form of a sideway channel at parts of the circumferential portion. In this case, the fixing of the permanent magnets 42 on the rear side can be performed more firmly.

As stated above, this invention provides an effect wherein the permanent magnets can be positioned and fixed in the axial direction without increasing the number of parts thereby achieving the cost reduction.

What is claimed is:

1. A permanent magnet type rotating machine comprising:
    a cylindrical yoke;
    a plurality of permanent magnets installed on an inner periphery of said cylindrical yoke;
    a rotor rotatably installed at an inner peripheral portion of said plurality of permanent magnets;
    a plate having an outer peripheral portion disposed proximate to said cylindrical yoke and having an inner peripheral portion disposed proximate to a rotating shaft of said rotor; and
    a retaining portion integrally provided on said plate to elastically retain said plurality of permanent magnets in an axial direction.

2. A permanent magnet type rotating machine comprising:
    a cylindrical yoke having a punched-out portion;
    a plurality of permanent magnets installed on an inner, periphery of said cylindrical yoke;
    a rotor rotatably installed at an inner peripheral portion of said plurality of permanent magnets; and
    a retaining portion integrally provided on a single constituent member of said permanent magnet type rotating machine to elastically retain said plurality of permanent magnets in an axial direction wherein said plurality of permanent magnets are, pressed by said retaining portion in an axial direction and are positioned and fixed between said punched-out portion and said retaining portion.

* * * * *